United States Patent
Chae

(10) Patent No.: US 12,223,031 B2
(45) Date of Patent: Feb. 11, 2025

(54) FACE RECOGNITION SYSTEM AND METHOD CAPABLE OF UPDATING REGISTERED FACE TEMPLATES

(71) Applicant: CMITECH CO., LTD., Anyang-si (KR)

(72) Inventor: Jang-Jin Chae, Wonju-si (KR)

(73) Assignee: CMITECH CO., LTD., Anyang-si (KR)

( * ) Notice: Subject to any disclaimer, the term of this patent is extended or adjusted under 35 U.S.C. 154(b) by 565 days.

(21) Appl. No.: 17/426,889

(22) PCT Filed: Nov. 9, 2020

(86) PCT No.: PCT/KR2020/015581
§ 371 (c)(1),
(2) Date: Jul. 29, 2021

(87) PCT Pub. No.: WO2021/177544
PCT Pub. Date: Sep. 10, 2021

(65) Prior Publication Data
US 2022/0318369 A1    Oct. 6, 2022

(30) Foreign Application Priority Data

Mar. 4, 2020    (KR) ........................ 10-2020-0027174

(51) Int. Cl.
*G06V 40/16*    (2022.01)
*G06F 16/51*    (2019.01)
(Continued)

(52) U.S. Cl.
CPC .............. *G06F 21/45* (2013.01); *G06F 16/51* (2019.01); *G06F 21/32* (2013.01); *G06V 10/751* (2022.01);
(Continued)

(58) Field of Classification Search
CPC .......... G06F 21/45; G06F 16/51; G06F 21/32; G06F 16/50; G06V 10/751; G06V 10/761;
(Continued)

(56) References Cited

U.S. PATENT DOCUMENTS

| | | | |
|---|---|---|---|
| 8,331,632 B1 | 12/2012 | Mohanty et al. | |
| 2002/0135618 A1* | 9/2002 | Maes | ...................... G10L 15/24 |
| | | | 715/767 |

(Continued)

FOREIGN PATENT DOCUMENTS

| | | | | |
|---|---|---|---|---|
| CN | 109615733 A | * | 4/2019 | ......... G06K 9/00221 |
| KR | 10-2002-0057522 | | 7/2002 | |

(Continued)

*Primary Examiner* — Carl G Colin
*Assistant Examiner* — Hany S. Gadalla
(74) *Attorney, Agent, or Firm* — Nixon & Vanderhye, P.C.

(57) ABSTRACT

This invention relates to a face recognition system and method capable of updating a registered face template. The system comprises: a registered template DB in which registered face templates are stored; an authenticated template DB for storing authenticated face templates; and a controller for storing the authenticated face template in the authenticated template DB according to the user's face authentication, obtaining a similarity degree between each of a plurality of the authenticated face templates by using the plurality of the authenticated face templates stored in the authenticated template DB after a predetermined period has elapsed, obtaining the value of an average similarity degree for each of the plurality of authenticated face templates by using the values of the similarity degree, selecting as a new registered face template the authenticated face template having the value of the largest average similarity degree among the values of the average similarity degree and updating the registered face template by storing the new registered face template in the registered template DB.

13 Claims, 3 Drawing Sheets

(51) Int. Cl.
*G06F 21/32* (2013.01)
*G06F 21/45* (2013.01)
*G06V 10/74* (2022.01)
*G06V 10/75* (2022.01)
*G06V 10/82* (2022.01)

(52) U.S. Cl.
CPC ............ *G06V 10/761* (2022.01); *G06V 10/82* (2022.01); *G06V 40/161* (2022.01); *G06V 40/168* (2022.01)

(58) Field of Classification Search
CPC .... G06V 10/82; G06V 40/161; G06V 40/168; G06V 40/172; G06V 40/50; G06V 40/16
See application file for complete search history.

(56) References Cited

U.S. PATENT DOCUMENTS

| | | | |
|---|---|---|---|
| 2010/0020224 A1* | 1/2010 | Hattori | G11B 27/105 382/224 |
| 2010/0080425 A1* | 4/2010 | Bebis | G06V 40/1353 382/125 |
| 2017/0140212 A1* | 5/2017 | Lo | G06V 40/171 |
| 2019/0116043 A1 | 4/2019 | Zhou et al. | |
| 2019/0122024 A1* | 4/2019 | Schwartz | G06V 40/1347 |

FOREIGN PATENT DOCUMENTS

| | | |
|---|---|---|
| KR | 10-2008-0090035 | 10/2008 |
| KR | 10-1421952 | 7/2014 |
| KR | 10-2137060 | 7/2020 |

\* cited by examiner

【Fig. 1】

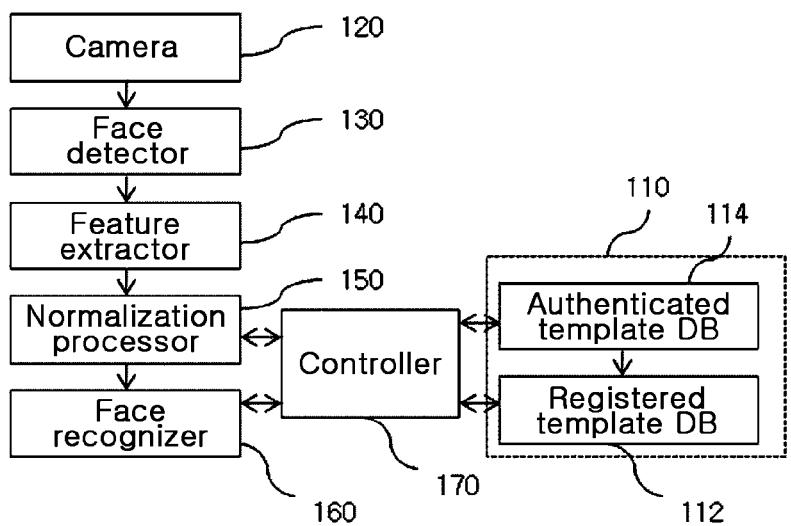

【Fig. 2】

| User | Face template | Feature point information | Template value | Time information | Size information |
|---|---|---|---|---|---|
| ID1 | Authenticated template 1 | Feature point 1 | Template value 1 | 1/10 08:33 | 150 X 240 |
| ID1 | Authenticated template 2 | Feature point 2 | Template value 2 | 1/10 10:05 | 100 X 170 |
| ID1 | Authenticated template 3 | Feature point 3 | Template value 3 | 1/10 12:55 | 160 X 250 |
| ID1 | Authenticated template 4 | Feature point 4 | Template value 4 | 1/10 15:14 | 130 X 225 |
| ID1 | Authenticated template 5 | Feature point 5 | Template value 5 | 1/10 16:50 | 155 X 240 |
| ID1 | Authenticated template 6 | Feature point 6 | Template value 6 | 1/10 18:10 | 180 X 280 |

[Fig. 3]
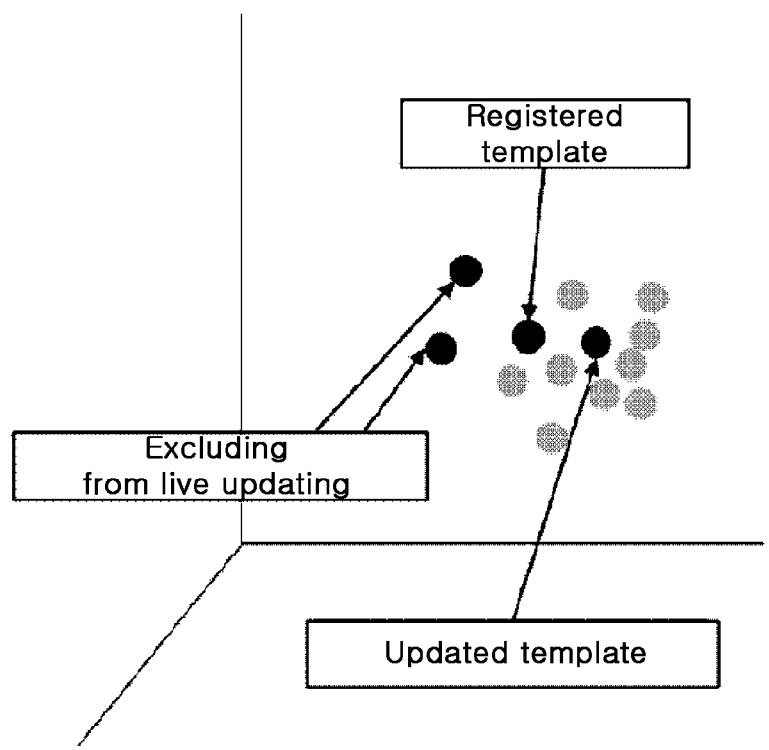

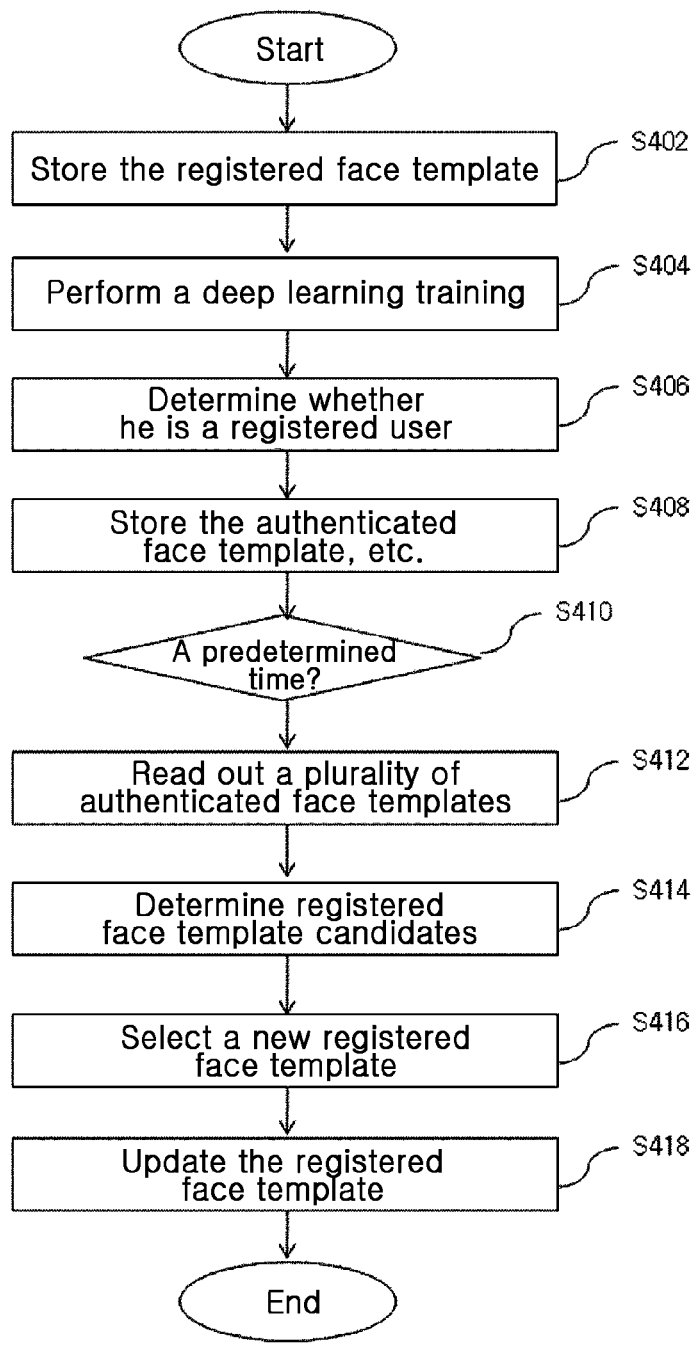

FACE RECOGNITION SYSTEM AND METHOD CAPABLE OF UPDATING REGISTERED FACE TEMPLATES

This application is the U.S. national phase of International Application No. PCT/KR2020/015581 filed Nov. 9, 2020 which designated the U.S. and claims priority to KR Patent Application No. 10-2020-0027174 filed Mar. 4, 2020, the entire contents of each of which are hereby incorporated by reference.

BACKGROUND OF THE INVENTION

1. Field of the Invention

The present invention relates to a face recognition system and method capable of updating a registered face template, and more particularly, to a face recognition system and method capable of automatically updating a registered face template using authenticated face templates.

2. Description of the Prior Art

A face recognition technology is a technology for automatically detecting and analyzing a face region from an image including a face to determine what kind of person a corresponding face is, and has been studied for a long time in the field of pattern recognition and computer vision. The face recognition technology has recently been actually applied in the fields such as surveillance systems, immigration control or biometrics, based on the results of many studies.

This face recognition technology is known to show high performance as a relatively mature technology when compared with other object recognition technologies. However, it is known that there are still many problems to be solved in the image acquired in the real environment due to pose and lighting changes, long-distance shooting and low resolution/blur caused by human movement.

In other words, the face image for actual authentication may be changed due to various variables such as the user's pose, the degree of bright and darkness around the user, and the difference of light and darkness between the user's faces and the like. As a result, it often occurs that the user's authentication fails or the authentication processing time increases.

In addition, a technology capable of automatically updating a registered face image based on the face images used for authentication by the user. However, if the face image to be automatically updated is not properly determined, the number of authentication failures may increase.

SUMMARY OF THE INVENTION

In order to solve the above problems, it is an object of the present invention to provide a face recognition system and method capable of automatically updating a registered face template by using the similarity between the authenticated face templates.

According to an embodiment, a face recognition system may include: a registered template DB in which registered face templates are stored; an authenticated template DB for storing authenticated face templates; and a controller for storing the authenticated face template in the authenticated template DB according to the user's face authentication, obtaining the similarity degree between each of a plurality of the authenticated face templates by using the plurality of the authenticated face templates stored in the authenticated template DB after a predetermined period has elapsed, obtaining the value of an average similarity degree for each of the plurality of authenticated face templates by using the values of the similarity degree, selecting as a new registered face template the authenticated face template having the value of the largest average similarity degree among the values of the average similarity degree and updating the registered face template by storing the new registered face template in the registered template DB.

The controller may store a template value obtained from the authenticated face template through a neural network; obtain a distance between each of the plurality of authenticated face templates by using values of the plurality of authenticated face templates stored in the authenticated template DB in order to select the new registered face template; obtain an average distance value for each of the plurality of authenticated face templates by using these distance values; and select as the new registered face template the face template having the smallest average distance value among the average distance values.

The controller may obtain a distance between each of the plurality of authenticated face templates and select the new registered face template by using only values of the authenticated face template whose average distance value is equal to or less than a predetermined average distance value.

The controller may store in a time information area of the authenticated template DB time information in which the authenticated face template is stored and select the new registered face template for each predetermined time interval by using the time information stored in the time information area.

The system may further comprise a camera for capturing an image including a face, wherein the controller store, in the size information area of the authenticated template DB, size information of the face image in the image captured by the camera and select the new registered face template by using only values of the authenticated face template whose size information stored in the size information area is equal to or greater than a predetermined size value.

The size information of the face image may be a maximum size of at least one of a width and a height of the face image or the number of pixels of the face image.

The system may further comprise: a camera for capturing an image including a face; a face detector for detecting a face image from the image captured by the camera; a feature extractor for extracting feature point information from the face image; a normalization processor for generating an aligned face template by normalizing the face image using the feature point information; and a face recognizer for comparing the face template inputted from the normalization processor with the registered face template stored in the registered template DB to determine whether the input face template is one of a registered user.

According to another embodiment, a face recognition method performed by a face recognition system including a registered template DB in which a registered face template is stored and an authenticated template DB for storing the authenticated face templates, may comprise the steps of: storing the authenticated face template in the authenticated template DB according to the user's face authentication; obtaining the similarity degree between each of a plurality of authenticated face templates by using the plurality of authenticated face templates stored in the authenticated template DB after a predetermined period has elapsed; obtaining the value of an average similarity degree for each of the plurality of authenticated face templates by using the value of the similarity degree; selecting as the new registered face template the authenticated face template having the value of the largest average similarity degree among the values of the average similarity degree; and updating the registered face template by storing the new registered face template in the registered template DB.

The method may further comprise the steps of: storing the template value obtained from the authenticated face template through a neural network; obtaining a distance between each of the plurality of authenticated face templates by using the values of the plurality of authenticated face templates stored in the authenticated template DB; obtaining an average distance value for each of the plurality of authenticated face templates by using these distance values; and selecting as the new registered face template the face template having the smallest average distance value among the average distance values.

The newly registered face image may be a face image closest to the average one among face images during a predetermined period. Therefore, by using this, the speed of authenticating the user's face can be improved, and authentication failures can be reduced.

In the present invention, by excluding some face images from the authenticated face images, it is possible to further reflect changes in the face images according to changes in aging, season, etc., and also reduce authentication failures.

BRIEF DESCRIPTION OF THE DRAWINGS

FIG. 1 is a diagram illustrating a block diagram of a face recognition system according to an embodiment of the present invention.

FIG. 2 is a diagram illustrating an example of a table of the authenticated template DB shown in FIG. 1.

FIG. 3 is a diagram illustrating in a coordinate form template values stored in the template value area shown in FIG. 2.

FIG. 4 is a diagram illustrating a flowchart of a face recognition method according to another embodiment of the present invention.

DETAILED DESCRIPTION OF THE EXEMPLARY EMBODIMENTS

Hereinafter, a preferred embodiment of a face recognition system and method capable of updating a registered face template according to the present invention will be described with reference to the accompanying drawings. For reference, in describing the present invention below, the terms referring to the components of the present invention are named in consideration of the function of each component. Accordingly, each term should not be construed as limiting the technical components of the present invention.

FIG. 1 is a diagram illustrating a block diagram of a face recognition system according to an embodiment of the present invention. FIG. 2 is a diagram illustrating an example of a table of the authenticated template DB shown in FIG. 1. FIG. 3 is a diagram illustrating in a coordinate form template values stored in the template value area shown in FIG. 2.

As shown in FIG. 1, the face recognition system includes a template storage 110, a camera 120, a face detector 130, a feature extractor 140, a normalization processor 150, and a face recognizer 160, and a controller 170. The face recognition system may be specifically divided into a face processing device (not shown) and a management server (not shown) to be operated.

The template storage 110 is a storage space for storing templates, and includes a registered template DB 112 and an authenticated template DB 114. The registered template DB 112 may store registered face templates stored for registration, their normalized feature point information, their template values, and time information at which they are stored. The authenticated template DB 114 may store authenticated face templates related to the user's face authentication, their normalized feature point information, their template values, time information in which they are stored, and size information related to the face detected by the face detector 130. An example of a table of the authenticated template DB 114 is shown in FIG. 2.

The camera 120 is installed near the door to take an image including a face.

The face detector 130 basically detects a face image existing in the image captured by the camera 120. Here, the image captured by the camera 120 is one image including a face. The face detector 130 may detect a face image from an image inputted from the camera 120 by using a Haar-like feature algorithm. In this case, the face parts (head, eyes, nose, mouth, and beard) can be individually detected to be determined as the final face. The face detector 130 may improve the performance of final face detection by finely tuning the face image.

The feature extractor 140 extracts feature point information from the user's face image. The feature extractor 140 may extract 68 feature points, i.e. landmarks, from the face image by using, for example, a 3D face geometric model learned in advance.

The feature extractor 140 finds eyebrows, eyes, nose, and mouth regions and surrounding feature points from the face image and maps them on the face image. Of course, the feature points are not limited to the specific parts listed above. The feature extractor 140 may be specifically implemented as a pattern classifier such as a support vector machine (SVM). The feature extractor 140 may recognize the degree of left and right tilt of the face based on the positions of the two eyes.

The feature extractor 140 may also be adapted to extract a feature vector from the landmark information and recognize the user's facial expression and the user's current emotional state by using the feature vector. In this case, the feature extractor 140 may extract a feature vector from the landmark information by using the angle and distance ratio information between the landmarks. In particular, when extracting a feature vector, it is important to reduce the amount of computation by minimizing the dimension of the feature vector. Accordingly, it is possible to improve the speed of recognizing the user's facial expression compared to the existing face recognition technology.

The feature extractor 140 may also create feature vectors for expressing the face image by using for example the texture features of the face image, the morphological features of the entire face image, and the morphological features of body parts (eyes, nose, mouth, etc.). The feature extractor 140 may also convert the face image from an RGB image to a brightness-chrominance (Y/C) image, and generate the feature vector from the converted image. Here, the chrominance image refers to an image in which a difference between colors is expressed by using only pure color information while excluding a brightness value. The feature extractor 140 may generate the feature vector by using only the chrominance image except for the brightness image in order to reduce the effect of lighting.

The normalization processor 150 generates an aligned face image by normalizing the face image by using feature point information extracted from the face image. The normalization processor 150 does affine transformation of the face image by using feature point information, that is, a two-dimensional affine transformation or a three-dimensional affine transformation, to perform image normalization processing such as face alignment and luminance correction. In this case, the face image may be rotated and corrected so that the center of the eyes and the center of the mouth are perpendicular, and the size of the face image may be adjusted so that the distance between the center of the eyes and the center of the mouth is 40 pixels. Accordingly, even if the detected face image is a side view instead of a front view, it is possible to convert this image and generate a front face image.

The face image aligned by the normalization processor 150 may be stored in the template storage 110 as a face template. In this case, the normalized feature point information obtained from the aligned face image may be stored in the template storage 110 to replace the face template or may be stored in a separate area together with the face template. The normalization processor 150 divides the face image into a plurality of blocks by using the normalized feature point information, and then generates a normalized feature vector for each block. The controller 170 may store the normalized feature vector of each block in the normalized feature point information area of the template storage 110. In this embodiment, the face template and the normalized feature point information obtained from the aligned face image are distinguished from each other. However, it should be noted that since the normalized feature point information obtained from the aligned face image is derived from the aligned face image, the normalized feature point information is included in the face template.

The face recognizer 160 determines whether the face template of the input image is the face template of the registered user, by comparing the face template of the image inputted into the camera 120 with the registered face template stored in the registered template DB 112. The face recognizer 160 may use various deep learning techniques, such as Deep Neural Network (DNN), Convolutional Neural Network (CNN), Recurrent Neural Network (RNN), Restricted Boltzmann Machine (RBM), Deep Belief Network (DBN), Deep QNetworks, but is not limited thereto. In the present embodiment, the face recognizer 160 may be configured with a convolutional neural network composed of several layers. In this case, a locally connected convolutional layer may be used to effectively extract local features in the face region.

The face recognizer 160 may determine the similarity of the face by using feature point information of the face template. In this case, the face recognition unit 160 may determine the similarity degree for all stored registered face templates by using the face templates of the input image, and may determine whether the user is a registered user by using respective similarity results. For example, it is assumed that there are four registered face templates stored in the registered template DB 112, and the face similarity degree is determined to be 97%, 85%, 80%, and 75% for each. In this case, it may be checked whether the captured user is a registered user by using the highest value of the similarity degree. If the highest value of the similarity degree is higher than a reference value, the user may be determined as the registered user. For example, the reference value is 95%. Since the highest value of the similarity degree 97% is higher than the reference value, the user is determined as the registered user.

Specifically, the face recognizer 160 may call the face template processed by the normalization processor 150 and the registered face template stored in the registered template DB 112, provide the data to the convolutional neural network per block, determine a block template value for each block to determine the similarity degree for each block, and sum them all up to determine the overall similarity degree. In this case, the similarity degree may be calculated by using a normalized feature vector of each block stored in the registered template DB 112 or by using a template value.

Meanwhile, the face recognizer 160 may perform a face verification in connection with training. The face verification may verify whether two face templates of the same person are determined as the same person. Through this, it is possible to reduce the misrecognition rate occurring in the process of recognizing faces in an image.

At training, facial feature points may be trained by using a plurality of learning models. The plurality of learning models may include at least one of a user's face learning model, another's face learning model, a lighting learning model, and a pose learning model. For example, at training, training data may be divided into at least one region based on the facial feature points detected from the training data of the plurality of learning models and the facial feature points may be trained.

At training, it is possible to store, in a buffer, a representative feature vector for each facial feature point as many as the number of facial feature points used in the training data. For example, due to the facial characteristic, the data of the facial feature point of the same person is formed around a specific vector, so the representative feature vector serving as the center may be stored in a separate buffer to make it the central point of learning.

At training, if different images of the same user are input as learning data by a predetermined input number, it is possible to determine output values of facial feature points resulting from lighting changes, and facial feature points resulting from pose changes.

In the registration mode, the controller 170 stores in the registered template DB 112 the registered face template processed and generated by the normalization processor 150. And the controller 170, in the training mode, may control the face recognizer 160 to perform a deep learning training where the verified face template of the same user processed and generated by the normalization processor 150 is compared with the registered face template stored in the registered template DB 112 and to provide the values of face verification according to training to a convolutional neural network.

In the authentication mode, the controller 170 may control the face recognizer 160 to determine whether the face template of the input image is the one of the registered user, by comparing the face template processed and generated by the normalization processor 150 with all of the face templates registered in the registered template DB 112, If the face template of the input image is the one of a registered user, the controller 170, for example, after opening the door, may store the face template of the inputted image and/or the normalized feature point information in the face template area and/or the feature point information area of the authenticated template DB 114; may store in the template value area the template value calculated by the face recognizer 160 through the convolutional neural network, and simultaneously may store a storage time in a time information area. Also, the controller 170 may store size information related to the face detected by the face detector 130 in the size information area of the authenticated template DB 114. In this case, the size information may be the maximum horizontal and/or vertical size of the face image or the number of pixels in the face image.

The controller 170 may update the registered face template stored in the registered template DB 112 after a predetermined period, for example, one month. The controller 170 calls the template values of the corresponding user, for example ID1, stored in the authenticated template DB 114. The template values stored in the template value area shown in FIG. 2 are shown in FIG. 3 in a coordinate form. Here, the blue color is the template value of the registered face template currently stored in the registered template DB 112, and all other colors are template values of the face templates stored in the authenticated template DB 114.

The controller 170 determines a similarity degree between the template values determined during a predetermined period; obtains the value of the average similarity degree for each of a plurality of authenticated face templates by using the similarity degree; and selects as a new registered face template the face template having the value of the largest average similarity degree among these values of the average similarity degree. The controller 170 then updates the registered face template by storing in the registered template DB 112 all information about the face template selected as the registered face template. In this case, the controller 170 may maintain the previously stored information of the registered face template as it is. Thus, the controller 170 may process face recognition by using the registered face template newly updated in the registered template DB 112. If the similarity degree is low, the face recognition may be further processed by using the registered face template previously stored in the registered template DB 112.

Here, the value of the average similarity degree is determined as follows: for example, assuming that there are three authenticated face templates, if the similarity degree between the first authenticated face template and the second authenticated face template is 82, the similarity degree between the second authenticated face template and the third authenticated face template is 90, and the similarity between the first authenticated face template and the third authenticated face template is 86, then the average similarity degree of the first authenticated face template is (82+86)/2=84, the average similarity degree of the second authenticated face template is (82+90)/2=86, and the average similarity degree of the third authenticated face template is (90+86)/2=88. Therefore, among them, the authenticated face template having the value of the largest average similarity degree is the third authenticated face template.

Specifically, the controller 170 may obtain a distance between templates by using the template values; obtain an average distance value for each of a plurality of authenticated face templates by using this distance value; select as a new registered face template a face template which has the template having the smallest average distance value among these average distance values. In this case, the controller 170 may pre-exclude from the registered face template candidates those whose average distance values are equal to or greater than a predetermined threshold value. That is, among the entire distribution of template values of the face templates stored in the authenticated template DB 114, those outside a predetermined deviation may be excluded from the registered face template candidates. As shown in FIG. 3, the left two template values are closer to the registered face template value compared to the template values located on the right, but are far from all template values stored in the authenticated template DB 114. In this way, the face template selected as the new registered face template may further reflect the change of the face image resulting from aging or season change.

The controller 170 may also use the size information of the face image detected by the face detector 130 to exclude in advance a face template whose size information is smaller than a predetermined threshold value from the registered face template candidates. Thereby, it is possible to remove an error resulting from the normalization process.

The controller 170 may also obtain a registered face template for each predetermined time interval by using time information in which the face template is stored. Accordingly, it is possible to reflect the change of the face according to time during the day and the change of illumination that occurs during the night and day section.

FIG. 4 is a diagram illustrating a flowchart of a face recognition method according to another embodiment of the present invention.

In the registration mode, the controller 170 stores in the registered template DB 112 the registered face template processed and generated by the normalization processor 150 (S402).

In the training mode, the controller 170 controls the face recognizer 160 in the training mode, so the face recognizer 160 performs deep learning training to compare the verified face template of the same user processed and generated by the normalization processor 150 with the registered face template stored in the registered template DB 112 (S404).

In the authentication mode, the controller 170 controls the face recognizer 160 in the authentication mode, so the face recognizer 160 determines whether the face template of the input image is the one of the registered user, by comparing the face template processed and generated by the normalization processor 150 with all of the face templates registered in the registered template DB 112 (S406).

When the face template of the input image is the one of the registered user, the controller 170 stores in the face template area of the authenticated template DB 114 the face template of the inputted image as the authenticated face template (S408). In this case, the controller 170 may store the normalized feature point information in the feature point information area of the authenticated template DB 114; store in the template value area the template value obtained through the convolutional neural network by the face recognizer 160; and simultaneously store the storage time in the time information area. Also, the controller 170 may store size information related to the face detected by the face detector 130 in the size information area of the authenticated template DB 114.

The controller 170 obtains whether a predetermined period, for example, one month, has elapsed (S410). When a predetermined period has elapsed, the controller 170 reads out a plurality of authenticated face tem plates stored in the authenticated template DB 114 (S412).

The controller 170 obtains a distance between each of a plurality of authenticated face templates, and determines as registered template candidates (S414) only values of the authenticated face templates whose average distance value is less than or equal to a predetermined average distance value. In this case, the controller 170 may further determine, as registered template candidates, the values of the authenticated face templates whose size information stored in the size information area of the authenticated template DB is equal to or greater than a predetermined size value.

The controller 170 obtains a similarity degree between each of the registered template candidates determined from among a plurality of authenticated face templates stored in the authenticated template DB 114; and selects as a new registered face template the authenticated face template having the value of the largest average similarity degree (S416).

In this case, in order to select a new registered face template, the control unit 170 may determine a distance between each of the authenticated face template values of the registered template candidates selected from among the values of a plurality of authenticated face templates stored in the authenticated template DB 114; and select as a new registered face template the face template having the value of the smallest average distance.

The controller 170 updates the registered face template by storing the selected new registered face template in the registered template DB 112 (S418).

The embodiments of the present invention described above are merely illustrative of the technical idea of the present invention, and the protection scope of the present invention should be interpreted by the following claims. In addition, those of ordinary skill in the art to which the present invention pertains will be able to make various modifications and variations without departing from the essential characteristics of the present invention. Therefore, all technical ideas within the scope equivalent to the present invention should be construed as being included in the scope of the present invention.

What is claimed is:

1. A face recognition system capable of updating a registered face template comprising:
    a registered template database in which a registered face template is stored, wherein the registered face template is a face template generated from a face image of a registered user and used as a reference for authenticating the face template of a user attempting a face authentication;
    an authenticated template database for storing a plurality of authenticated face templates, wherein each of the plurality of authenticated face templates is a face template generated from a face image of the user attempting the face authentication, and whenever the user attempting the face authentication is determined as the registered user in the face authentication, the face template of the user attempting the face authentication used during the face authentication is stored in the authenticated template database as one of the authenticated face templates;
    a camera for capturing an image including a face of the user attempting the face authentication;
    a face detector comprising instructions executable by a processor comprising circuitry for detecting a face image from the image captured by the camera;
    a feature extractor comprising instructions executable by a processor comprising circuitry for extracting feature point information from the detected face image;
    a normalization processor for generating an aligned face template by normalizing the face image using the extracted feature point information; and
    a face recognizer comprising instructions executable by a processor comprising circuitry for calculating a similarity degree between the aligned face template inputted from the normalization processor and the registered face template stored in the registered template database, and determining the user attempting the face authentication as the registered user when the similarity degree is higher than a reference value;
    a controller for obtaining similarity degrees respectively for every combination between each of a plurality of the authenticated face templates by using the plurality of the authenticated face templates stored in the authenticated template database after elapse of a predetermined period during which the face authentication has been performed multiple times; obtaining the value of an average similarity degree for each of the plurality of authenticated face templates by averaging the values of the similarity degrees associated with itself; selecting as a new registered face template one of the authenticated face templates having the value of the largest average similarity degree among the values of the average similarity degree; and updating the registered face template by storing the new registered face template in the registered template database.

2. The face recognition system according to claim 1, wherein the controller stores, in a time information area of the authenticated template database, time information in which each of the authenticated face templates is stored; and selects the new registered face template for each predetermined time interval by using the time information stored in the time information area.

3. The face recognition system according to claim 1, wherein the controller stores, in a size information area of the authenticated template database, size information of the face image in the image captured by the camera; and selects the new registered face template by using only values of each of the authenticated face templates whose size information stored in the size information area is equal to or greater than a predetermined size value.

4. The face recognition system according to claim 3, wherein the size information of the face image is a maximum size of at least one of a width and a height of the face image or a number of pixels of the face image.

5. A face recognition method having a function of updating a registered face template performed by a face recognition system capable of updating a registered face template according to claim 1, wherein the registered face template is a face template generated from a face image of a registered user, and the registered face template is a face template which is used as a reference for authenticating the face template of a user attempting a face authentication,
    the method comprising the steps of:
        storing a plurality of authenticated face templates in the authenticated template database, wherein each of the plurality of authenticated face templates is a face template generated from a face image of a user attempting a face authentication, and whenever the user attempting the face authentication is determined as the registered user in the face authentication, the face template of the user attempting the face authentication used during the face authentication is stored in the authenticated template database as one of the authenticated face templates;
        obtaining a similarity degree respectively for every combination between each of a plurality of authenticated face templates by using the plurality of authenticated face templates stored in the authenticated template database after a predetermined period has elapsed then the face authentication has been performed multiple times;
        obtaining the value of an average similarity degree for each of the plurality of authenticated face templates by averaging the value of the similarity degree associated with itself;

selecting as a new registered face template one of the authenticated face templates having the value of the largest average similarity degree among the values of the average similarity degree; and updating the registered face template by storing the new registered face template in the registered template database.

6. A face recognition system comprising:

memory configured to store a registered template database including a registered face template and configured to store an authenticated template database including a plurality of authenticated face templates, wherein the registered face template includes a face template generated from a face image of a registered user and used as a reference for authenticating the face template of a user attempting a face authentication, and wherein each of the plurality of authenticated face templates includes a face template generated from a face image of the user attempting the face authentication, the user attempting the face authentication is determined as the registered user in the face authentication, the face template of the user attempting the face authentication used during the face authentication is stored in the authenticated template database as one of the authenticated face templates;

a camera configured to capture an image including a face of the user attempting the face authentication;

a processor comprising circuitry, the processor configured to:

detect a face image from the image captured by the camera;

extract feature point information from the detected face image;

generate an aligned face template by normalizing the face image using the extracted feature point information;

calculate a similarity degree between the aligned face template inputted and the registered face template stored in the registered template database;

determine the user attempting the face authentication as the registered user when the similarity degree is higher than a reference value;

obtain similarity degrees respectively for every combination between each of a plurality of the authenticated face templates by using the plurality of the authenticated face templates stored in the authenticated template database after elapse of a predetermined period during which the face authentication has been performed multiple times;

obtain the value of an average similarity degree for each of the plurality of authenticated face templates by averaging the values of the similarity degrees associated with itself;

select as a new registered face template one of the authenticated face templates having the value of the largest average similarity degree among the values of the average similarity degree; and update the registered face template by storing the new registered face template in the registered template database.

7. The face recognition system according to claim 6, wherein the processor is configured to:

store, in a time information area of the authenticated template database, time information in which each of the authenticated face templates is stored; and select the new registered face template for each predetermined time interval by using the time information stored in the time information area.

8. The face recognition system according to claim 6, wherein the processor is configured to:

store, in a size information area of the authenticated template database, size information of the face image in the image captured by the camera; and select the new registered face template by using only values of each of the authenticated face templates whose size information stored in the size information area is equal to or greater than a predetermined size value.

9. The face recognition system according to claim 8, wherein the size information of the face image is a maximum size of at least one of a width and a height of the face image or a number of pixels of the face image.

10. A face recognition method for updating a registered face template performed by a face recognition system including memory configured to store a registered template database including a registered face template and configured to store an authenticated template database including a plurality of authenticated face templates, wherein the registered face template includes a face template generated from a face image of a registered user and used as a reference for authenticating the face template of a user attempting a face authentication, and wherein each of the plurality of authenticated face templates includes a face template generated from a face image of the user attempting the face authentication, the user attempting the face authentication is determined as the registered user in the face authentication, the face template of the user attempting the face authentication used during the face authentication is stored in the authenticated template database as one of the authenticated face templates, and a camera configured to capture an image including a face of the user attempting the face authentication, the method comprising:

detecting a face image from the image captured by the camera;

extracting feature point information from the detected face image;

generating an aligned face template by normalizing the face image using the extracted feature point information;

calculating a similarity degree between the aligned face template inputted and the registered face template stored in the registered template database;

determining the user attempting the face authentication as the registered user when the similarity degree is higher than a reference value;

obtaining similarity degrees respectively for every combination between each of a plurality of the authenticated face templates by using the plurality of the authenticated face templates stored in the authenticated template database after elapse of a predetermined period during which the face authentication has been performed multiple times;

obtaining the value of an average similarity degree for each of the plurality of authenticated face templates by averaging the values of the similarity degrees associated with itself;

selecting as a new registered face template one of the authenticated face templates having the value of the largest average similarity degree among the values of the average similarity degree; and updating the registered face template by storing the new registered face template in the registered template database.

11. The face recognition method according to claim 10, further comprising:
storing, in a time information area of the authenticated template database, time information in which each of the authenticated face templates is stored; and
selecting the new registered face template for each predetermined time interval by using the time information stored in the time information area.

12. The face recognition method according to claim 10, further comprising:
storing, in a size information area of the authenticated template database, size information of the face image in the image captured by the camera; and
selecting the new registered face template by using only values of each of the authenticated face templates whose size information stored in the size information area is equal to or greater than a predetermined size value.

13. The face recognition method according to claim 10, wherein the feature point information is extracted from the detected face image using a locally connected convolutional layer of a neural network.

* * * * *